July 9, 1929.   J. MAYO   1,719,897
LEER
Filed Oct. 1, 1927   2 Sheets-Sheet 1
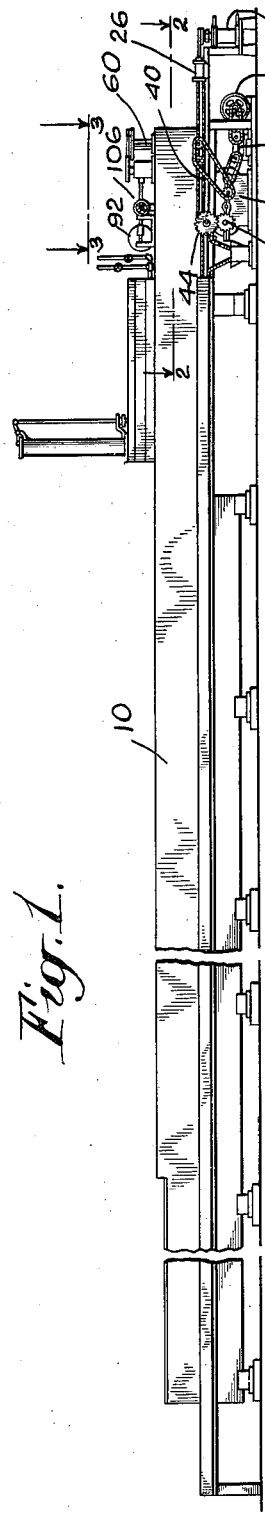
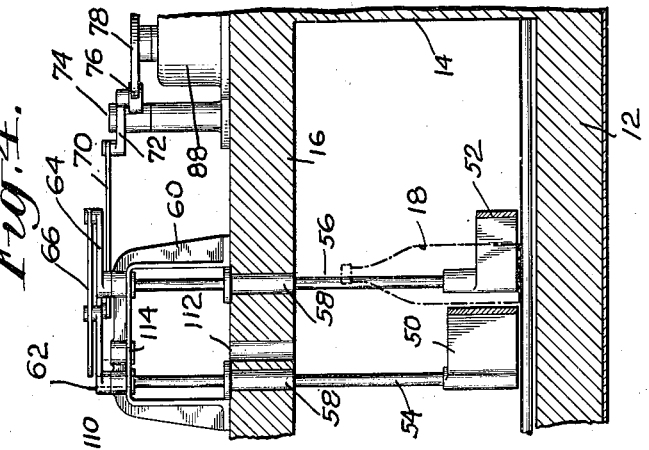
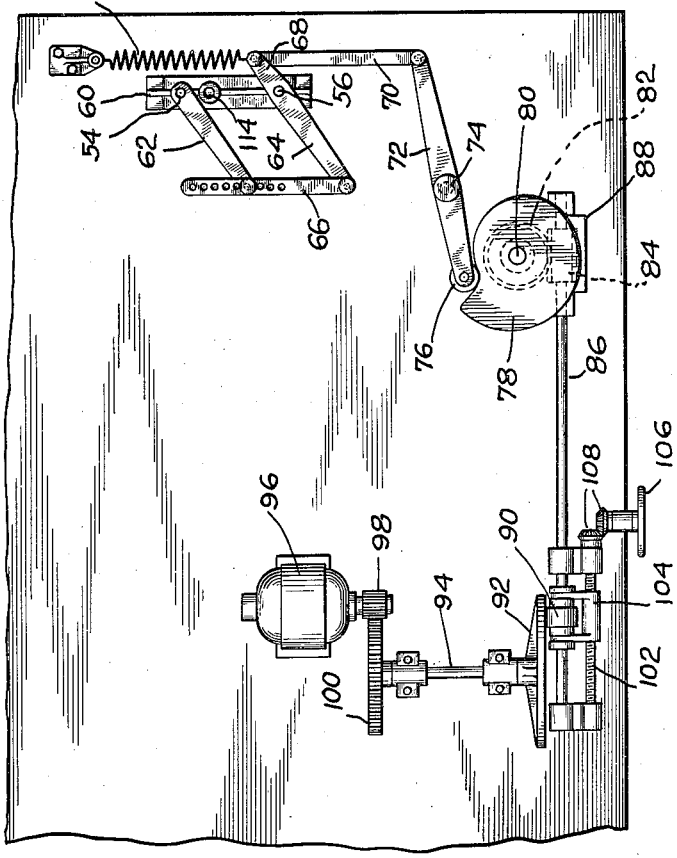
Inventor
John Mayo
By his Attorneys
Cooper, Kerr & Dunham

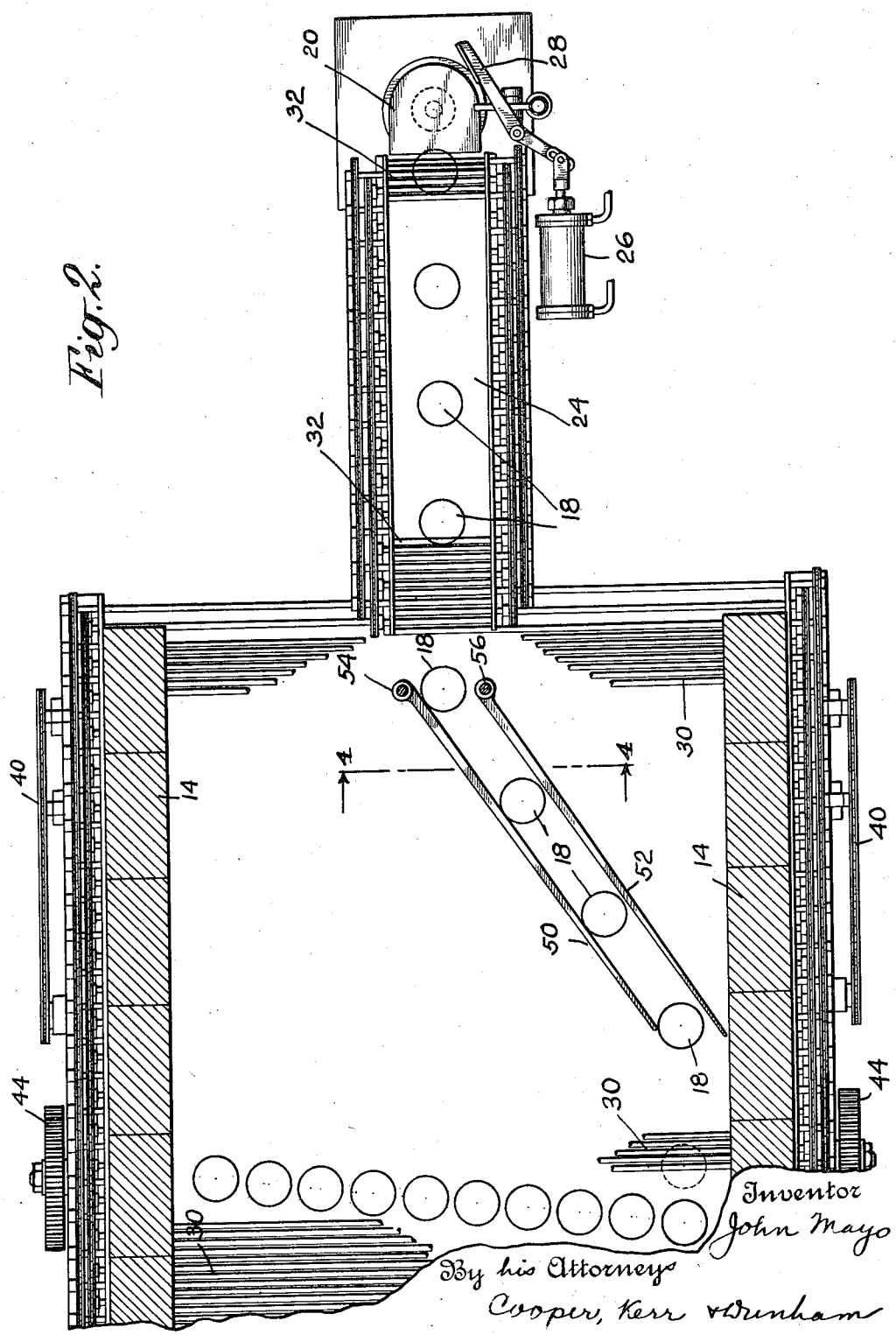

Patented July 9, 1929.

1,719,897

UNITED STATES PATENT OFFICE.

JOHN MAYO, OF FAIRMONT, WEST VIRGINIA, ASSIGNOR TO THERMAL ENGINEERING CORPORATION, OF LONG ISLAND CITY, NEW YORK, A CORPORATION OF NEW YORK.

LEER.

Application filed October 1, 1927. Serial No. 223,451.

This invention pertains to annealing furnaces, or leers, used in the manufacture of glass articles such as bottles, tumblers, fruit jars, table ware, etc., and is an improvement on the leer disclosed in the copending application of Orie Shackelford, filed April 29, 1927, Serial No. 187,470.

The present invention has particular reference to the distributing system which receives the pieces of ware one by one from the molding machine and arranges the pieces in predetermined formation within the leer preparatory to their passage through the annealing and cooling chambers of the leer.

The ware is usually arranged in rows crosswise of the leer. In the above Shackelford application the distributing system is suitable for arranging rows containing either two, four, eight, sixteen, or thirty-two pieces of ware. For highest efficiency of operation the number of pieces per row should be determined by the width of the leer and the diameter of the ware. It is therefore uneconomical to put eight, sixteen, or thirty-two bottles in a row when the width of the leer is more suitable for some other number of pieces.

The present invention provides a distributing system capable of arranging the ware in cross rows of any number, the number per row being governed by the speed of oscillation of the guide arms and the speed of the conveyor which carries the ware lengthwise of the leer.

The invention comprises an oscillating device and mechanism for controlling it so as to permit the operator to arrange cross rows containing any desired number of pieces of ware.

Another object is to provide a distributor or "stacker" capable of handling a wide variety of diameters of ware.

Further and other objects and advantages will be hereinafter set forth in the accompanying specification and claims, and shown in the drawings, which by way of illustration show what is now considered to be the preferred embodiment of the invention.

Fig. 1 is a side view of a complete leer.

Fig. 2 is an enlarged sectional plan view of the distributor or "stacker", on the line 2—2 of Fig. 1.

Fig. 3 is an enlarged plan view, on the line 3—3 of Fig. 1.

Fig. 4 is an enlarged fragmentary sectional view, on the line 4—4 of Fig. 2.

In the above mentioned Shackelford application the complete leer is described in detail, therefore the present description will be confined to discussion of only those features necessary for an understanding of the present invention.

The leer comprises a long brick oven 10 having a bottom 12, side walls 14, and roof 16.

The pieces of ware 18 are received one at a time from the molding machine on platen 20 which is raised by air cylinder 22 until level with the narrow conveyor 24 which is an extension of the leer floor. Whereupon air cylinder 26 actuates lever 28 to sweep the bottle or other piece of ware from platen 20 onto the conveyor.

The pieces are delivered from the molding machine at regular intervals of time and the conveyor moves them at uniform speed, therefore the pieces are spaced at equal distances along the conveyor.

The floor of the conveyor comprises rollers 30 extending the full width of the leer and constantly rotating to carry the pieces of ware through the leer. The rollers of the narrow feed conveyor 24 are designated 32.

Power is supplied to the conveyor by motor 34 through a speed changing device 36 and gear box 38. Chain 40 drives rollers 32 and rollers 30 to a point just beyond the back ushers. From that point to the discharge end of the leer the floor rollers 30 are driven by gears 42—44. The conveyor drive is divided as above described in order that a comparatively high speed of travel may be imparted to the ware while passing in single file through the distributing system, and a comparatively slow speed of travel while traveling in rows arranged crosswise of the leer after passing the distributor. The speed of the entire conveyor may be changed by means of device 36, while the relative speeds of the two sections may be varied by changing gears 42 and 44. In the arrangement herein disclosed the ware after leaving the distributor will travel approximately one tenth as fast as it traveled through the distributor.

The distributor comprises a pair of oscillatory arms 50 and 52 pivoted just above the leer floor on the lower ends of rods 54 and 56 which pass through sleeves 58 in the roof of the leer. After passing through the leer roof rods 54 and 56 pass through bearings in a bracket 60. Fast to rods 54 and 56 above bracket 60 are arms 62 and 64. The free ends of arms 62 and 64 are connected by link 66 which serves to maintain arms 62, 64 and 50, 52 parallel with each other in all operative positions. Arm 64 is provided with a short arm 68 projecting on the opposite side of pivot 56. To arm 68 is attached a horizontal link 70, the other end of which is attached to the free end of arm 72. Arm 72 is pivoted at 74 and carries on its other end a roller 76 in contact with the rim of cam 78 which is fast on the upper end of vertical shaft 80. Fast on shaft 80 below cam 78 is a worm gear 82 driven by worm 84 on horizontal shaft 86. Shaft 80, gear 82, and worm 84 are supported and enclosed by housing 88 mounted on the roof of the leer.

Splined on the other end of shaft 86 is a friction pulley 90, in contact with the face of friction disk 92 which is fast on the end of shaft 94 driven by motor 96 through pinion 98 and gear 100. Pinion 90 may be moved to different radial positions on disk 92 by means of screw 102 passing through shifter frame 104 and actuated by hand wheel 106 and bevel gears 108. This arrangement permits the operator to regulate at will the speed of rotation of cam 78. Cam 78 rotates counterclockwise (Fig. 3) and is so shaped that as arms 50 and 52 (Fig. 2) oscillate across the leer the ends of the arms will move equal distances lengthwise of rollers 30 in equal intervals of time.

The motion starts from the left side of the leer with roller 76 on the lowest part of the cam. The roller gradually moves outwardly on the cam until the arms reach the right side of the leer, whereupon roller 76, actuated by spring 110 through link 70 and lever 72, drops again to the low part of the cam, causing arms 50 and 52 to sweep quickly back across the leer to their starting point at the left side thereof.

With the above in mind, the operation of the device will be readily understood. The bottles enter the leer in single file and equally spaced one behind the other as shown in Fig. 2. The bottles enter between blades 50 and 52. While between the blades they are carried lengthwise of the leer by rollers 30 and crosswise thereof by the oscillating arms. The two relative motions are so timed that the bottles pass out of control of the arms at equal spaced intervals, to be then carried directly lengthwise of the leer by the fast moving rollers 30 to a position on the slow moving rollers 30. In this manner a row of bottles is formed crosswise of the leer substantially as shown in Fig. 2. In this figure a row of bottles has just been completed from left to right of the leer (from bottom to top in the figure), and the arms have swept back to the left side to begin another row. The bottle just emerging from between the blades will take a position directly behind the first bottle of the preceding row, as indicated by the dotted circle. In this manner rows are formed one behind the other crosswise of the leer.

As shown in Fig. 4, arm 50 is wider from top to bottom than arm 52. During the travel of the arms from left to right, while arm 52 is in contact with the ware, the movement is very slow and a low arm such as 52 will move the ware with no danger of upsetting it. On the return stroke, however, while arm 50 is active, the motion is rapid and a comparatively high arm is required in order to avoid upsets.

By means of the speed-changing device the speed of rotation of cam 78 may be varied within wide limits, thereby enabling the operator to vary the number of pieces of ware in each cross row and their distance apart.

To better accommodate ware of different diameters, arms 50, 52 may be set closer together or further apart. For instance rod 54 may be moved closer to rod 56 by placing guide bushing 58 which surrounds rod 54 in another hole 112 through the roof of the leer. The upper end of rod 54 will then pass through another bearing 114 in bracket 60, and another hole in link 66 will be used for connecting the link to arm 62 so as to maintain links 62 and 64 in proper alignment. Any unused holes 112 in the leer roof are plugged by asbestos or other suitable material.

It is to be understood that the invention is not limited to the construction herein specifically illustrated but can be embodied in other forms without departure from its spirit.

I claim—

1. In a leer, in combination, a conveyor for transporting glassware through the leer, an oscillating device, means comprising said conveyor for feeding pieces of glassware into and through said device, and means for actuating said device to arrange said pieces in rows crosswise of the leer.

2. In a leer, in combination, a conveyor for transporting glassware through the leer, an oscillating device, means comprising said conveyor for feeding pieces of ware into and through said device, and means for oscillating said device across the leer from one side to the other whereby the pieces of ware will be discharged from said device at intervals crosswise of the leer.

3. In a leer, in combination, an oscillating device, means for feeding pieces of ware into said device, and means for oscillating said device back and forth across the leer, the device moving slowly in one direction and quickly in the other direction, and the pieces of ware being discharged at intervals from said device during the slow stroke thereof.

4. In a leer, in combination, an oscillating device having a discharge outlet, means for oscillating said device back and forth across the leer, means for supplying pieces of ware to said device, and conveyor means for moving the ware longitudinally of the leer while in said device, the relative motions of said conveyor and said device being so regulated as to discharge the pieces of ware at equally spaced intervals across the leer.

5. In a leer, in combination, a pair of pivoted guide arms, means for oscillating said arms back and forth across the leer, means for feeding pieces of ware one by one to the space between said arms, and means for moving said pieces through said space whereby the pieces are discharged therefrom at spaced intervals across said leer.

6. The invention set forth in claim 5, in which means is provided for adjusting the speed of oscillation of said arms relatively to said moving means whereby the pieces of ware may be discharged from said space at desired intervals across the leer.

7. The invention set forth in claim 5, in which means is provided for adjusting the width of said space to accommodate different sizes of ware.

8. The invention set forth in claim 5, in which means is provided for oscillating said arms slowly in one direction and rapidly in the other direction across the leer, and in which the arm contacting with the ware in said space during the rapid stroke is of sufficient vertical depth to prevent tipping the ware during the rapid motion thereof.

9. The invention set forth in claim 5, in which a cam is provided for oscillating said arms slowly in one direction across the leer and a spring is provided for returning said arms rapidly in the other direction across the leer for the purpose set forth.

In testimony whereof I hereto affix my signature.

JOHN MAYO.